United States Patent [19]

Kutnyak

[11] 4,385,018
[45] May 24, 1983

[54] METHOD AND APPARATUS FOR MAKING INSULATED, REINFORCED FLEXIBLE HOSE

[75] Inventor: Thomas A. Kutnyak, Greenwood, S.C.

[73] Assignee: Automation Industries, Inc., Greenwich, Conn.

[21] Appl. No.: 215,879

[22] Filed: Dec. 12, 1980

Related U.S. Application Data

[62] Division of Ser. No. 853,121, Nov. 21, 1977.

[51] Int. Cl.³ .............................................. B29D 27/00
[52] U.S. Cl. .................................. 264/45.9; 264/103; 264/173; 425/113; 425/817 C
[58] Field of Search ...................... 264/45.9, 103, 173; 425/113, 817 C

[56]       References Cited
       U.S. PATENT DOCUMENTS 2,810,424 10/1957 Swartswelter et al. ............ 264/103
2,888,954  6/1959 Gates .................................... 138/137
3,116,760  1/1964 Matthews ............................ 138/125
3,249,666  5/1966 French ................................ 264/103
4,044,799  8/1977 Higbee et al. .................. 138/137 X
4,205,034  5/1980 Newberry ........................... 264/103

FOREIGN PATENT DOCUMENTS 1303803  1/1973 United Kingdom ................ 264/500

*Primary Examiner*—Philip E. Anderson
*Attorney, Agent, or Firm*—Francis N. Carten

[57]              ABSTRACT

Hose continuously manufactured with an extruded elastomeric liner with a flexible strand reinforcement laid on the outer surface thereof together with a foam/sponge insulation layer thereon which is attached to the liner between the reinforcement strands. The apparatus comprises a ram air extruder mechanism for extruding the elastomeric foam outer insulation layer, or by addition of chemical blowing agents to the insulation compound.

14 Claims, 11 Drawing Figures

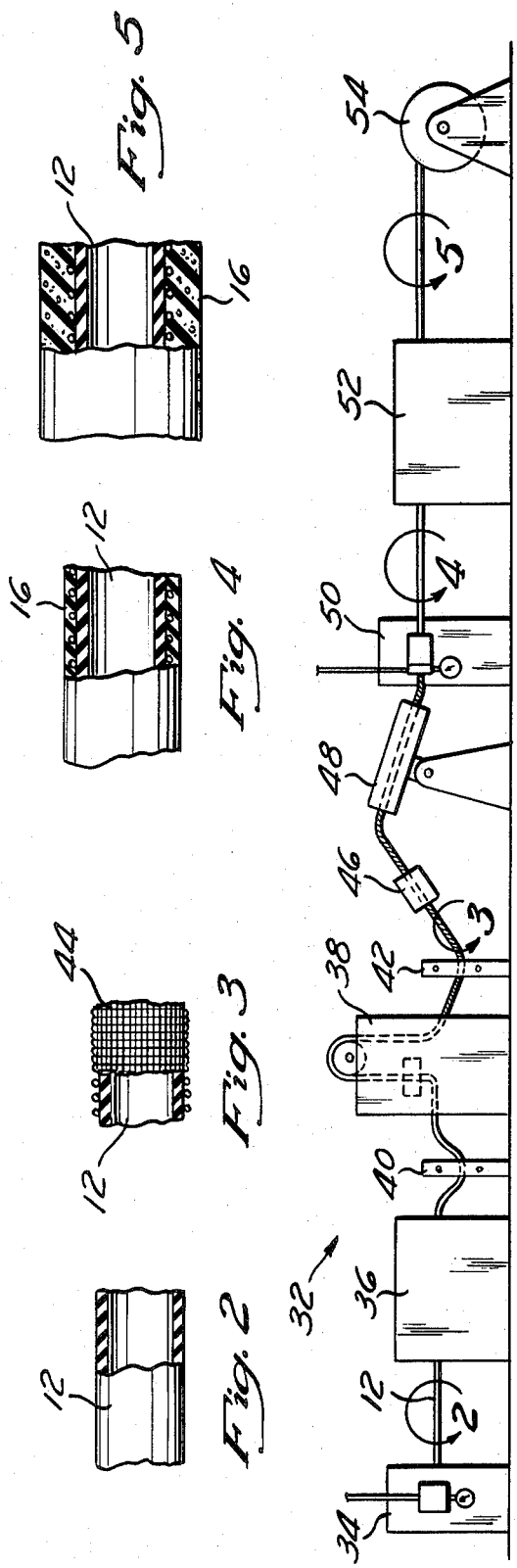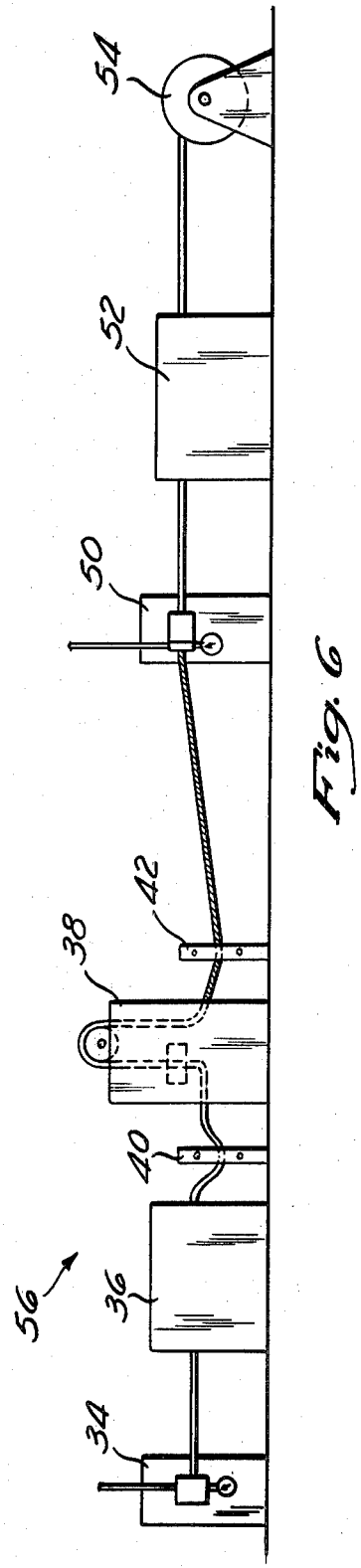

METHOD AND APPARATUS FOR MAKING INSULATED, REINFORCED FLEXIBLE HOSE

This is a division of application Ser. No. 853,121, filed on Nov. 21, 1977.

BACKGROUND

This invention is directed to a reinforced and insulated flexible hose made with elastic materials and flexible reinforcement strands, together with the apparatus and method for making the hose.

Prior technology consists of two known methods of insulating hoses. Each of these methods apply a sponge or foam material by a secondary operation. In the first prior method, a hose having any type of construction or material is selected for the insulation application. A foam or sponge tubular extrusion is produced with the inside diameter slightly larger than the outside diameter of the hose. This extrusion is slid over the hose. Generally, no adhesive is applied to the outside of the hose. The disadvantages of this construction include the fact that this method of manufacture is only successful with short lengths, generally under about 12 feet in length, depending on the sizes, materials and clearances. Of course, it is difficult to slide the foam extrusion over the hose, and this results in high labor costs due to the assembly time. With the resulting two-piece construction, there is no adhesion between the insulation and the hose, and this results in a structure which is more difficult to package and with a weight disadvantage due to the method of construction. Generally, the hose is purchased from one source, and the extruded outer tubular insulation layer from another, resulting in a difficult problem in achieving the size tolerances which permit practical assembly.

The second prior art method utilizes a flat, precut width and length of an extruded or molded flat, flexible foam or sponge insulation material. This material is wrapped around a previously extruded, flexible hose. A longitudinal butt or lap seam is adhesively bonded to complete the hose assembly. The disadvantages of this type of construction include the fact that no adhesion of the insulation material to the hose is achieved. Another disadvantage is the need to form a joint of the porous insulation material with its adhesive joint, because such joints are difficult to form in a secure fashion. Generally, this method is used to cover only short lengths of hose, possibly due to the high cost of labor in connection with the insulation material layer application and adhesive joining. Manufacturerers of such hoses usually buy the hose and insulation material from different sources, with the result of more difficult coordination and assembly. This often results in a weight disadvantage for this type of construction. It is not commercially supplied in lengths over 50 feet.

Thus, there is a need for an economic and secure reinforced insulated hose produced on a continuous basis with unitary construction without adhesive joints in the insulation layer. Furthermore, it is desirable to have a long hose so that long runs can be made with such an insulated hose without having to join several short lengths of hose.

SUMMARY

In order to aid in the understanding of this invention, it can be stated in essentially summary form that it is directed to a reinforced and insulated hose and apparatus and method therefor, with the hose comprising a continuously extruded, flexible hose liner with a flexible strand-type reinforcement thereon which leaves access to a portion of the outer surface of the hose liner, and a continuously extruded flexible foam cover layer thereon which is bonded through to the liner surface so that a continuously extruded reinforced and insulated hose is produced.

It is thus an object of this invention to provide a reinforced and insulated hose which is of bonded and continuously produced construction so that long, indefinite lengths can be manufactured. It is another object to provide a reinforced insulated flexible hose wherein a flexible liner is reinforced and is covered with an insulator layer. It is a further object to provide a flexible hose construction which is reinforced and insulated and wherein each of the layers is structurally bonded together, but without the use of seams so that a structure of long life is achieved. It is another object to provide a method whereby such a reinforced and insulated flexible hose construction can be produced. It is a further object to provide an extruder apparatus where entrained air can be introduced into rubberlike materials during the extrusion process to result in a continuously extruded foamed insulated layer on the hose. It is another object to add chemical blowing agents to the plastic or rubberlike compound prior to extrusion and to employ a vulcanization process to result in a continuously extruded foamed insulated layer on the hose.

Other objects and advantages of this invention will become apparent from a study of the following portion of the specification, the claims, and the attached drawings.

BRIEF DESCRIPTION OF THE DRAWINGS

FIG. 1 is a side-elevational view of the preferred embodiment of the apparatus by which the reinforced and insulated flexible hose of this invention is made and by which the method steps in producing it are achieved.

FIG. 2 is a side-elevational view of the hose, with parts broken away and parts taken in section, as seen at point 2 in FIG. 1.

FIG. 3 is a side-elevational view of the hose, with parts broken away and parts taken in section, as seen at point 3 in FIG. 1.

FIG. 4 is a side-elevational view of the hose, with parts broken away and parts taken in section, as seen at point 4 in FIG. 1.

FIG. 5 is a side-elevational view of the finished hose with parts broken away and parts taken in section, as seen at point 5 in FIG. 1.

FIG. 6 is a side-elevational view of another preferred embodiment of the apparatus by which the reinforced and insulated hose of this invention is produced and the method achieved.

DESCRIPTION OF THE PREFERRED EMBODIMENT

Figure 8:
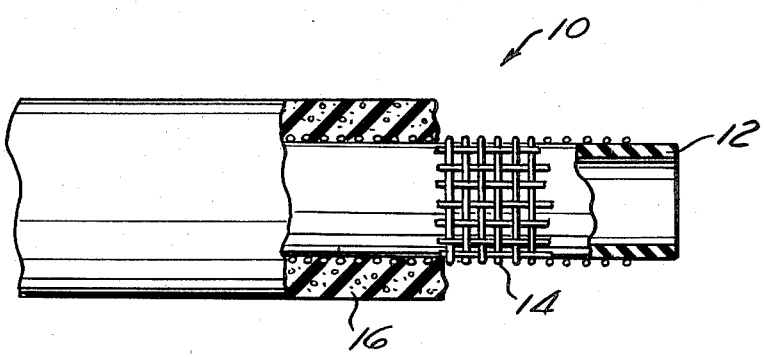
FIG. 8 is a side-elevational view, with parts broken away and parts taken in section, of a first preferred embodiment of the reinforced and insulated hose of this invention.

FIG. 8 shows the first preferred embodiment of the reinforced and insulated flexible hose produced by this invention. The hose is generally indicated at 10 therein. Hose 10 comprises hose liner 12, reinforcement 14 thereon, and foamed or sponge layer 16 which forms the insulation layer and outer layer of hose 10. Reinforcement 14 is formed as a plain pattern tubular continuous knit reinforcement layer, with an open space of about 3/32" in the knitting. The open space through the knitted fabric reinforcement layer is so that the outer foam/sponge layer 16 can directly attach to the outer surface of hose liner 12.

Figure 9:
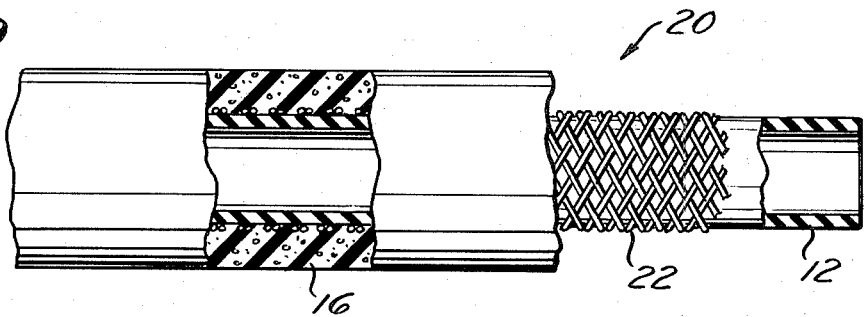
FIG. 9 is a side-elevational view, with parts broken away and parts taken in section, of a second preferred embodiment of the reinforced and insulated hose of this invention.

Hose 20, shown in FIG. 9, is the second preferred embodiment of the reinforced and insulated flexible hose produced by this invention. It has the same hose liner 12, but the reinforcement 22 thereon is a braided reinforcement with an open space. Preferably, it has an approximately ⅛ inch diamond braid pattern as a reinforcement structure. The open space between the strands of the open braid provide for direct attachment between the outer foam/sponge layer 16 and the hose liner.

Figure 10:
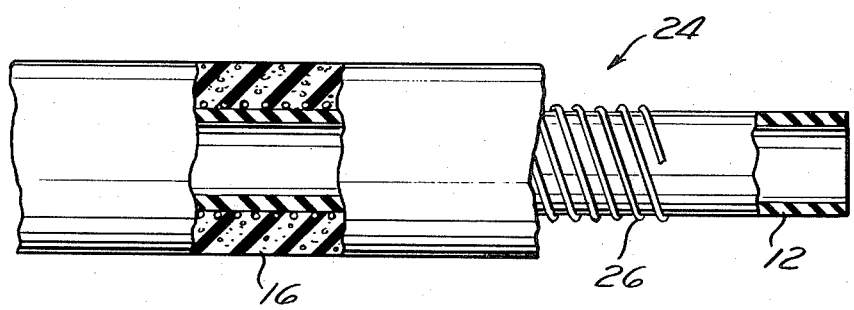
FIG. 10 is a side-elevational view, with parts broken away and parts taken in section, of a third preferred embodiment of the reinforced and insulated flexible hose of this invention.
Figure 11:
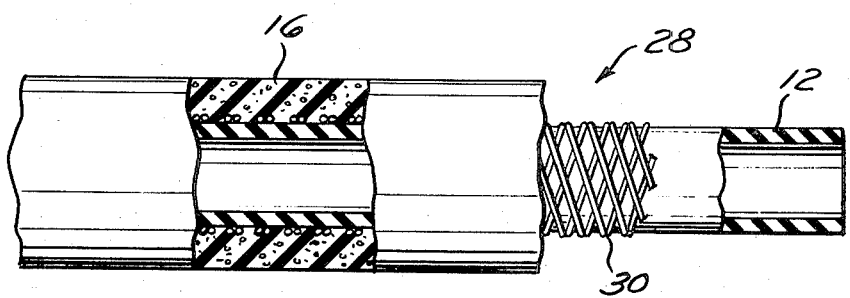
FIG. 11 is a side-elevational view, with parts broken away and parts taken in section of a fourth preferred embodiment of the reinforced and insulated hose of this invention.

FIG. 10 illustrates hose 24 as the third preferred embodiment of the reinforced and insulated flexible hose produced by this invention. Hose 24 has the same hose liner 12, but it is wrapped with spiral reinforcement 26. The spiral reinforcement 26 is a plurality of strands helically wrapped in the same direction. The number of strands is such that the strands are approximately at a 54 degree angle with respect to the axis of the hose and are spaced approximately ⅛ inch apart. Again, this space provides for attachment through of the foam/sponge layer 16 through the spiral reinforcement layer to the hose liner 12.

Hose 28 is the fourth preferred embodiment of the reinforced and insulated flexible hose produced by this invention. It comprises hose liner 12 which is wrapped with spiral reinforcement layer 30. Spiral reinforcement layer 30 is double-ply reinforcement with a plurality of strands helically wrapped around hose liner 12 in each direction. The spiral angle of both wraps is about 54 degrees with respect to the longitudinal axis of the hose, and there are enough strands layered in each direction so that the strands are spaced approximately ⅛ inch apart. This space provides for attachment of the insulation layer 16 to the liner layer 12.

Attachment of the foam/sponge layer 16 through the reinforcement layer and through the reinforcement layer to hose liner 12 is enhanced by application of a proper agent for such purpose. These agents may be called "primers," although they may have adhesive or other attachment enhancing properties. Depending on the material of the hose liner 12 and the foam/sponge layer 16, these primers can be selected from the following group: Chemlock 607 is an adhesive for silicone rubber and specialty elastomers. It is made by Hughson Chemicals Division of Lord Corporation, Erie, PA 16512. Also included in this group is isocyanate and surface active chemicals such as xylene, hexine, BCA, cyclohexanone. Also in this group are other adhesives suitable for the combination of materials.

Hose liner 12 and foam/sponge layer 16 can be selected from the same group. This group has the subgroups of elastomers and flexible synthetic polymer composition materials. The elastomer subgroup includes silicone rubber, EPDM, CPE, ethylene acrylic, neoprene, nitrile, epochlorohydrin, Viton, and other synthetic and organic rubberlike compounds. The flexible synthetic polymer composition material subgroup includes polyvinyl chloride, EVA, polyethylene, Halar, FEP, Kynar, and other similar materials.

The reinforcement strands 14, 22, 26, and 30 are selected from the group including Nomex, Kevlar, Dacron, nylon, Rayon, and fibreglass.

Referring to FIG. 1, the line of apparatus generally indicated at 32 produces the reinforced and insulated flexible hose of this invention. Extruder 34 is the number one extruder along the process line. It is preferably a conventional crosshead extruder to which the material for hose liner 12 is applied. The elastomer is mill- or strip-fed into the extruder. The elastomer is carried to the crosshead die where the hose liner 12 is extruded on a continuous basis. Air is applied to the inside of hose liner 12, thereby inflating liner 12 and preventing its collapse or kinking. After the extruded hose liner 12 exits from the die, it passes through curing chamber 36 where it is vulcanized or thermally stabilized.

Reinforcement-applying machine 38 is a knitter to produce hose 10, a braider to produce hose 20, or a spiral winder to produce hoses 24 or 28. Photocell loop height detectors 40 and 42 are positioned at the input and output of reinforcement-applying machine 38 so that feed rates of the various machines can be matched to prevent unbalanced feeding from machine to machine along the production apparatus 32. The output of reinforcement-applying machine 38 is reinforced hose 44 shown in FIG. 3.

Primer or surface conditioner is applied to the reinforced hose 44 by primer sprayer 46. A fine spray mist of the primer is applied to the exterior surface of the reinforced extruded liner 44. Next, the liner passes through preheater 48 before the next step. This preheater removes solvents from the primer and heats the reinforced hose 44 to a proper temperature to insure proper adhesion and preventing the extruder foam/sponge layer 16 from blowing away from the liner 44 during vulcanization.

Extruder 50 receives the reinforced hose liner and extrudes layer 16 thereon. Extruder 50 is a crosshead extruder with a suitable die so that as the reinforced hose liner enters the crosshead die of extruder 50, vacuum is applied to the outer surface at the location where the layer 60 is extruded thereon. This vacuum removes trapped air between the exterior of the reinforced hose and the new layer 16 applied thereto. The vacuum permits close contact between the newly extruded layer 16 and the outer surface of the reinforced hose liner. In this way, the layer 16 engages through the openings in the reinforcement layer and achieves an adhesive attachment through the reinforcement to the liner 12. In this way, secure attachment of layer 16 is achieved.

The layer 16 contains a material which causes it to expand into a foam or sponge material. The foam layer expansion is accomplished by the expansion of gas in the material. The gas bubble production in the material can either be accomplished by addition of chemical blowing agents or by entraining air or other common gas injectd by a ram air apparatus. Entrainment will be discussed in more detail below. Chemical blowing agents are thoroughly discussed in an article "Chemical Blowing Agents," by Byron A. Hunter, published in *Rubber Age*, February, 1976, pages 19–25. Additionally an article called "A Selection Guide to Blowing Agents for Structural Foam Molding" appeared in *Plastics Technology*, of March, 1976, at pages 31–36. Both these articles discuss various chemical blowing agents which may be incorporated in the layer 16 as it is extruded onto the hose.

The product being discharged from extruder 50 is shown in FIG. 4. This is the hose before the layer 16 is substantially expanded. The insulation layer 16 is extruded to a thickness of approximately 0.1 to 0.125 inch in the unexpanded condition. The structure is now a covered liner in the condition shown in FIG. 4. From the extruder 50, the covered liner enters curing chamber 52. The temperature of the curing chamber is set to activate the blowing agent or expand entrained air in the cover compound to form the expanded foam/sponge layer in the finished hose illustrated in FIG. 5. The temperature of the curing chamber 52 is sufficient to cause cross-linking or vulcanization of the rubberlike compound after the expansion is achieved. Thereupon, the structure is stabilized. Takeup reel 54 receives the finished product. The hose is thereafter cut to length and packaged.

FIG. 6 illustrates process apparatus 56 which is the same as process apparatus 32 except for the fact that no primer sprayer 46 is employed and no preheater 48 is employed. In this arrangement, the outer condition of the reinforced liner as it comes from reinforcement-applying machine 38 is satisfactory to achieve adhesive attachment thereto by the insulation layer 16 as it is applied by extruder 50. In that case, the materials are sufficiently compatible that attachment of the insulation layer to the liner layer, including through and/or to the reinforcement layer, is achieved by the materials without any special primer.

Figure 7:
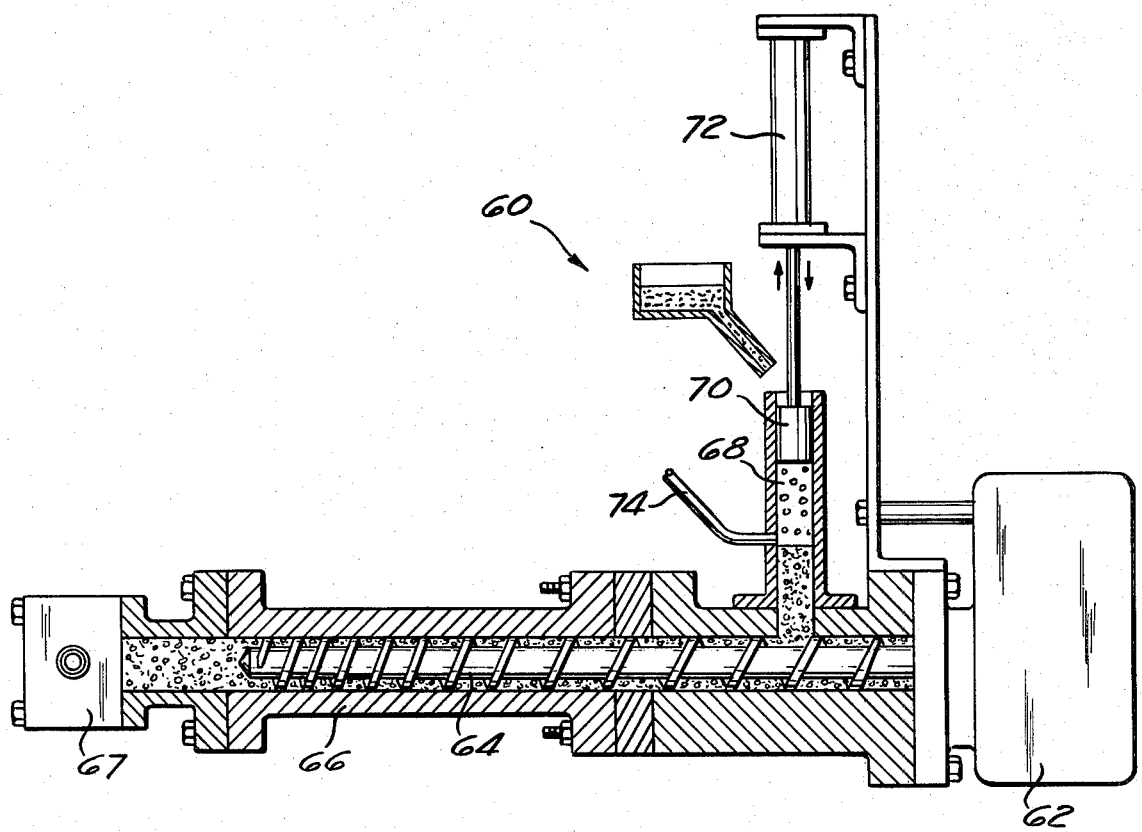
FIG. 7 is a side-elevational view, with parts broken away and parts taken in section, of the ram air device, extruder and crosshead die which produces the foam insulation on the hose of this invention.

The preferred process employs extruder 60, illustrated in FIG. 7, as the extruder which applies the covering 16 in the position of extruder 50 in FIGS. 1 and 6. The preferred process incorporates gas, including gas mixtures such as air, into the milled stock. Extruder 60 is a fairly conventional crosshead extruder which has the extruder gear box 62 driving extruder screw 64 in extruder barrel 66. Crosshead die 67 receives the reinforced tubing from one side through an inlet seal. Interiorly of the inlet seal, there is a sealed vacuum chamber followed by another seal, after which the cover extrusion takes place. Thus, the sealed vacuum chamber around the reinforced tubing is directly adjacent to the extrusion chamber so that a vacuum is drawn on the reinforced hose liner just before the extrusion of the cover thereon. The basic extruder is conventional, except that there are no air vents at the inlet end of the screw. The vacuum chamber is part of the process for producing the reinforced and insulated hose.

Another novel feature of extruder 60 relates to the introduction of raw material into the extruder. Feed chamber 68 is tubular and is open at the top and is connected to the interior of barrel 66 at the bottom. Ram 70 fits into the feed chamber and closes the top thereof. Ram 70 is raised and lowered by means air cylinder 72 which has its piston rod connected to ram 70. Thus, ram 70 can be raised out of the feed chamber for the introduction of stock into the feed chamber, and the ram can be brought down to close the feed chamber and force the stock into barrel 66 to be advanced by screw 64. Feed chamber 68 also has gas line 74 connected thereto. Compressed air is a convenient gas, although pressurized nitrogen is also feasible. Gas is introduced into feed chamber 68, and the gas is entrained into the feed stock as the feed stock is milled by extruder screw 64. With the positive stock feed accomplished by ram 70 and with the increasing pressure along with extruder screw 64, the gas is dissolved into or at least minutely entrained in the insulation layer material 16 as it is extruded as a cover onto the reinforced liner hose.

As constraining pressure is released as the insulation layer 16 moves out of the crosshead die, some expansion takes place. However, the principal part of the expansion takes place in curing chamber 52 where the entrained gas is heated and expands and blows the insulation layer 16 into a foam or sponge condition. Furthermore, the temperature in curing chamber 52 is sufficient to set the material of layer 16 by cross-linking or vulcanization so that it retains its foam/sponge characteristic even when the finished hose is cooled down. In this way, a reinforced and insulated flexible hose is produced, and the apparatus and method by which it is made is disclosed.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. The method of continuously making a reinforced and insulated flexible hose comprising the steps of:
   continuously forming a tubular hose liner of flexible material;
   continuously forming a reinforcement layer of at least one flexible reinforcement strand spacedly wound around the hose liner;
   continuously extruding a flexible expanded insulation cover over the liner and reinforcement layer; and
   applying a vacuum between the reinforced hose liner and the insulation cover to cause adhesive attachment thereof through the spaces between the at least one strand of the reinforcement layer.

2. The method of claim 1 further including the step of supplying inflation air to the interior of said hose liner as it is extruded to maintain it in tubular condition during subsequent reinforcement.

3. The method of claim 1 where the reinforcement application step comprising knitting reinforcement strands onto said hose liner.

4. The method of claim 1 where the reinforcement step comprises braiding reinforcement strands onto the exterior of said hose liner.

5. The method of claim 1 wherein the reinforcement step comprises helically winding a flexible reinforcement strand around said hose liner.

6. The method of claim 1 wherein the reinforcement step comprises the double winding in opposite helices of flexible reinforcement strands around said hose liner layer.

7. The method of claim 1 further including the step of applying primer to the reinforced hose liner before the step of extruding the insulation cover thereon.

8. The method of claim 1 further including the step of passing the reinforced hose carrying the insulation cover thereon through a curing chamber for the expansion of gas in the insulation cover to cause the insulation cover to become a closed cell foam/sponge layer with an outer skinned surface and to cause the curing of the insulation cover to maintain the insulation cover in the foam/sponge condition.

9. The method of claim 1 further including the step of drawing a vacuum on the reinforced cover immediately before the step of extruding the insulating cover thereon.

10. The method of claim 1 further including the step of adding a chemical blowing agent to the raw material used for extruding the insulation cover for producing a closed cell foam/sponge insulated hose by a continuous process.

11. The method of claim 1 wherein the step of continuously forming a tubular hose liner comprises the step of extruding the tubular hose liner.

12. The method of claim 11 wherein the step of continuously forming a tubular hose liner further comprises the step of curing the tubular hose liner.

13. An extrusion apparatus comprising:
an extrusion barrel;
an extrusion screw in said extrusion barrel, said extrusion barrel having only a stock feed chamber and an outlet, said stock feed chamber having a closure thereon and having a pressurized gas supply thereto so that stock in said closed feed chamber can have gas entrained therein as the stock is fed through said barrel by said extrusion screw;
crosshead die means operative to apply a vacuum to the exterior surface of an article introduced therein for the application of an extruded layer onto its exterior surface; and
drive means for said extrusion screw.

14. The extrusion apparatus of claim 13 wherein said feed chamber has a ram therein, said ram acting as said closure for said feed chamber and serving to advance extrusion stock through said feed chamber to said extrusion barrel.

* * * * *